United States Patent [19]
Vanderpoel

[11] 3,815,744
[45] June 11, 1974

[54] FILTER CONSTRUCTION

[76] Inventor: Albert G. H. Vanderpoel, 1126 Brightglen Cir., Westlake Village, Calif. 91361

[22] Filed: Jan. 2, 1973

[21] Appl. No.: 320,473

[52] U.S. Cl................... 210/94, 210/232, 210/442, 210/448, 210/453
[51] Int. Cl............................................ B01d 35/02
[58] Field of Search....... 210/94, 95, 232, 442, 446, 210/448, 453

[56] References Cited
UNITED STATES PATENTS

| | | | |
|---|---|---|---|
| 2,265,550 | 12/1941 | Smith | 210/94 |
| 2,793,752 | 5/1957 | Jay | 210/448 X |
| 3,317,043 | 5/1967 | Vanderpoel | 210/94 |
| 3,369,665 | 2/1968 | Paulson | 210/94 |

FOREIGN PATENTS OR APPLICATIONS

| | | | |
|---|---|---|---|
| 225,850 | 11/1959 | Australia | 210/94 |

*Primary Examiner*—John Adee
*Assistant Examiner*—Robert H. Spitzer
*Attorney, Agent, or Firm*—William W. Haefliger

[57] ABSTRACT

A fuel filter comprises:

a. an elongated rod-like body having opposite end portions which have lengthwise extending reliefs at the sides thereof, said end portions also having peripheral thread sections circumferentially interrupted by said reliefs, b. threaded caps mounted on said body thread sections to extend about the reliefs, c. a porous tubular filter element through which the body projects, d. the body having a closure thereon to close one end of the filter element so that the element is retained between said closure and one of said end caps closing the opposite end of said element, one body end portion relief then having direct communciation with the outside of the filter element and the other body end portion relief then having direct communication with the inside of the filter element, and e. a casing having opposite ends retained at said end caps and within which said body projects.

8 Claims, 6 Drawing Figures

PATENTED JUN 11 1974 3,815,744
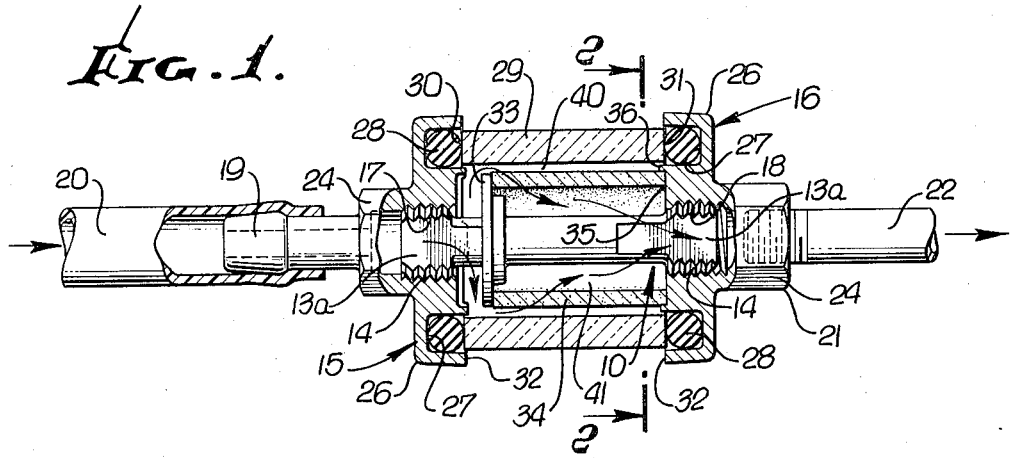
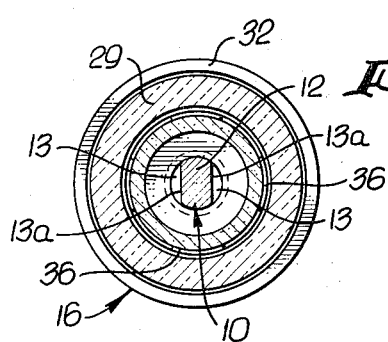
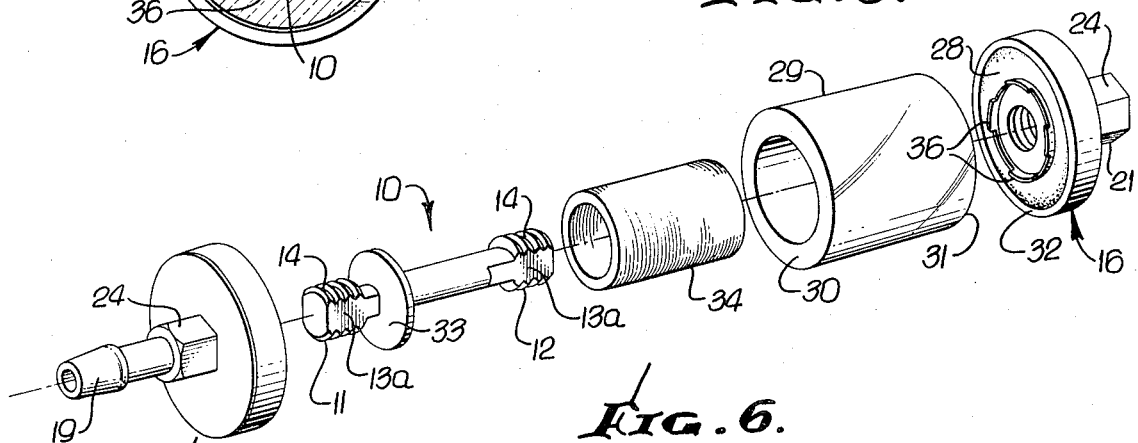
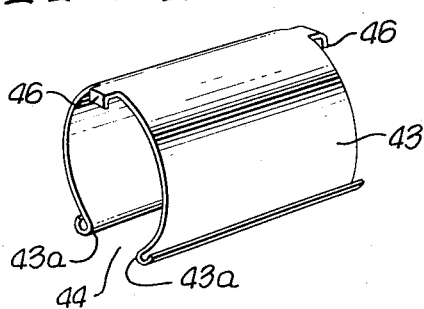
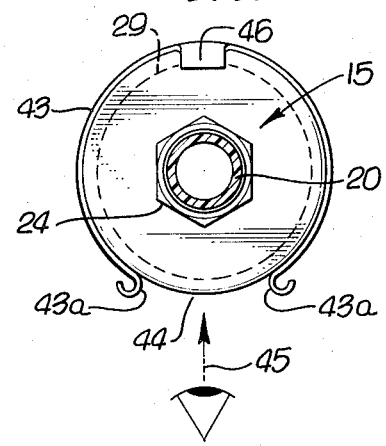

3,815,744

FILTER CONSTRUCTION

BACKGROUND OF THE INVENTION

This invention relates generally to fuel filters, and more particularly concerns in-line type filters such as may be used for example to filter gasoline as well as other fuels and gases.

In my U.S. Pat. No. 3,317,043 I described a fuel filter of highly advantageous construction and mode of operation. The present invention adds to the utility of that filter in that the construction is simplified, the flow is enchanced, and a protective shield is applied to the device, while permitting viewing of the contents of the filter, as before. The prior art, to my knowledge, lacks the construction, mode operation and results now afforded by the improved filter.

SUMMARY OF THE INVENTION

Basically, the filter construction comprises an elongated rod-like body having opposite end portions with lengthwise extending reliefs at opposite sides, the end portions also having peripheral thread sections which are circumferentially interrupted by the reliefs; internally threaded caps mounted on the body thread sections to bound the reliefs; a porous tubular filter element through which the body projects; the body having a closure to close one end of the filter element for retention between that closure and one of the end caps closing the opposite end of the element, one body end portion relief then having direct communication with the outside of the filter element, and the other body end portion relief then having direct communication with the inside of the filter element; and a casing having opposite ends retained at the end caps and within which the body projects. As a result, the reliefs and their relation to the remainder of the filter simplify the fabrication of the filter, and enhance its flow characteristics. In one form of the invention, the body cross section at the relief locus has I-shape, as will be seen.

Additional objects include the provision of a protective clip received over the casing to be forcibly rotated about the latter, the clip defining an aperture for viewing of a transparent portion of the casing, as will be seen.

These and other objects and advantages of the invention, as well as the details of an illustrative embodiment, will be more fully understood from the following description and drawings, in which:

DRAWING DESCRIPTION

FIG. 1 is a side elevation, in section;

FIG. 2 is a section on lines 2—2 of FIG. 1;

FIG. 3 is an axially exploded perspective view of the FIG. 1 filter;

FIG. 4 is a perspective showing of a clip receivable over the filter;

FIG. 5 is an end elevation showing the clip attached to the filter; and

FIG. 6 is a fragmentary perspective view of a modified body.

DETAILED DESCRIPTION

The fluid filter shown in the drawing comprises an elongated rod-like body 10 having opposite end portions 11 and 12. The latter have lengthwise extending reliefs 13 (such as are defined by flats 13a) at their opposite sides, as well as peripheral thread sections 14 circumferentially interrupted by the reliefs.

Tubular end caps 15 and 16, internally threaded at 17 and 18, and threadably mounted on the body end portion thread sections 14. Cap 15 includes a projecting tubular terminal defining a nipple 19 to receive a hose 20, whereas body 16 defines a projecting tubular terminal 21 which is internally threaded to receive an externally threaded pipe 22. It will be understood that one or both ends of the filter may receive either or both of the caps 15 and 16.

Each end cap may also include polygonal shoulders 24 to be wrench gripped, and a flange 26 grooved at 27 to receive a sealing O-ring 28 typically made of rubber or an elastomer. A tubular casing 29 has opposite ends 30 and 31 in annular sealing engagement with the O-ring seals, the clamping or sealing force being controlled by relatively advancing or retracting one or both end caps, as afforded by turning the end cap by means of a wrench applied to shoulders 24. The casing may for example consist of high-impact transparent plastic material, and the ends thereof are centered by the shoulder 32 at the grooving 27.

Body 10 has a closure 33 thereon to close one end of a porous tubular filter element 34 through which the body projects, the closure typically taking the form of a flange integral with the metallic body. The element 34 is endwise retained between the closure and one of the end caps closing off the opposite end of the filter element at 35. In this regard, the end cap has shoulders at 36 for locating the corresponding end of the filter element in coaxial alignment with the axis of body 10. As a result the opposite ends of the filter are mechanically sealed off or closed, so that all liquid passing through the filter element must pass through the porous tubular wall thereof.

In this regard, fuel flows through body end portion reliefs 13 into the space 40 at the outside of the filter element; the fuel then flows radially through the element and into the space 41 at the inside thereof, to exit via body end portion reliefs and to the right, in FIG. 1. Accordingly, impurities in the fuel can be observed in space 40 through the case 29, and the user can readily see when it is necessary to disassemble the filter and clean same. The filter element itself may be made of any suitable porous, filtering material. One highly advantageous material is identified by the trademark Microbon, and is supplied by the Bendix Corporation.

FIGS. 4 and 5 illustrate the provision of a spring clip or sleeve 43 which is U-shaped with curvature to closely conform to the cylindrical or tubular configuration of the transparent casing 29. The protective (as for example metallic) clip snaps over the casing, as in FIG. 5, and may be forcibly rotated to any angular position so that the aperture or gap 44 between the clip turned terminals 43a may be brought into the line of sight 45 of the viewer. This enables ready viewing when the filter is installed in a fuel line, as within the engine compartment of an automobile. End tangs 46 attach over the end caps 26 against which the clip has frictional engagement.

Finally, FIG. 6 shows a modified end portion 50 of the rod-like body 10, and which is generally I-shaped in cross section. The end portion is endwise slotted or milled at opposite sides of the body (for rapid production and maximum flow) to define two elongated side openings 51 intersecting the tip 52 of the end portion.

The length of each opening 51 exceeds that of the interruped external threading 53 on the end portion, and slot wall curvature at 54 guides the flow laterally away from or toward the body and the slot.

If desired, the casing or housing 29 may be metallic.

I claim:

1. A filter comprising
   a. an elongated rod-like body having opposite end portions each of which has endwise extending slots at opposite sides thereof to define two elongated side openings intersecting the tip of each said portion, said end portions also having peripheral thread sections circumferentially interrupted by said openings, the length of each said opening exceeding the length of the thread section interrupted thereby,
   b. threaded caps mounted on said body thread sections to extend about the reliefs,
   c. a porous tubular filter element through which the body projects,
   d. the body having a closure thereon to close one end of the filter element so that the element is retained between said closure and one of said end caps closing the opposite end of said element, one body end portion openings then having direct communication with the outside of the filter element and the other body end portion openings then having direct communication with the inside of the filter element, and
   e. a casing having opposite ends retained at said end caps and within which said body projects.

2. The combination of claim 1 wherein at least one of the caps has a projecting tubular terminal which is threaded to receive a threaded fitting.

3. The combination of claim 2 wherein the other cap has a projecting tubular terminal which defines a hose nipple.

4. The combination of claim 1 wherein each cap has a projecting tubular terminal which is threaded to receive a threaded fitting.

5. The combination of claim 1 including a protection clip received over said casing to be forcibly rotatable therearound, the clip defining an aperture through which a transparent portion of the casing may be viewed.

6. The combination of claim 5 wherein the clip is U-shaped and spring urged to resist sideward dislodgement off the casing.

7. The combination of claim 5 wherein the clip has opposite end attachment to said caps.

8. The combination of claim 1 wherein said body end portions have I-shaped cross sections.

* * * * *